United States Patent [19]

Berges et al.

[11] Patent Number: 4,561,837
[45] Date of Patent: Dec. 31, 1985

[54] METHOD OF PRODUCING A ROTOR FOR ROTARY SLIDE-VANE VACUUM PUMPS, AND A ROTOR PRODUCED BY SAID METHOD

[75] Inventors: Hanns-Peter Berges; Hans-Peter Kabelitz, both of Cologne, Fed. Rep. of Germany

[73] Assignee: Leybold-Heraeus, Cologne, Fed. Rep. of Germany

[21] Appl. No.: 150,034

[22] Filed: May 15, 1980

[30] Foreign Application Priority Data

May 22, 1979 [DE] Fed. Rep. of Germany ....... 2920626

[51] Int. Cl.[4] .................. B23P 13/00; B23P 15/00
[52] U.S. Cl. .................... 418/255; 418/270; 29/156.4 R; 29/445
[58] Field of Search .............. 29/156.4 R, 159.2, 463, 29/445, 281.4; 418/270, 110, 258, 255

[56] References Cited

U.S. PATENT DOCUMENTS

| 325,361 | 9/1885 | Rowbotham | 418/255 |
|---|---|---|---|
| 1,290,657 | 1/1919 | Rasmussen | 418/110 |
| 1,483,189 | 2/1924 | Pearson | 418/258 |
| 1,505,788 | 8/1924 | Larson et al. | 418/258 |
| 1,528,075 | 3/1925 | Richter | 418/258 |
| 1,572,738 | 2/1926 | Maroger | 418/270 |
| 2,380,628 | 7/1945 | Zempel | 29/445 |
| 2,782,725 | 2/1957 | Hójberg | 418/258 |
| 3,522,647 | 8/1970 | Holcomb et al. | 29/463 |
| 3,760,480 | 9/1973 | Tupker | 29/445 |

FOREIGN PATENT DOCUMENTS

| 2338962 | 2/1975 | Fed. Rep. of Germany | 418/270 |
|---|---|---|---|
| 1018506 | 1/1966 | United Kingdom | 29/DIG. 26 |

Primary Examiner—Daniel C. Crane
Attorney, Agent, or Firm—Felfe & Lynch

[57] ABSTRACT

A rotor for a rotary slide-vane vacuum pump and a method of producing same comprises providing two rotor sections, each having a shaft stub, a rotor portion and a plane or contact surface produced by lathing, forming axial slot portions for accommodate one or more slide vanes through the contact surfaces, assembling the two rotor sections by the use of an assembling jig and fixedly joining the sections together and finishing the external surfaces of the assembled rotor with respect to at least one of length and diameter while the rotor is held in one and the same fixture.

11 Claims, 1 Drawing Figure

U.S. Patent  Dec. 31, 1985  4,561,837
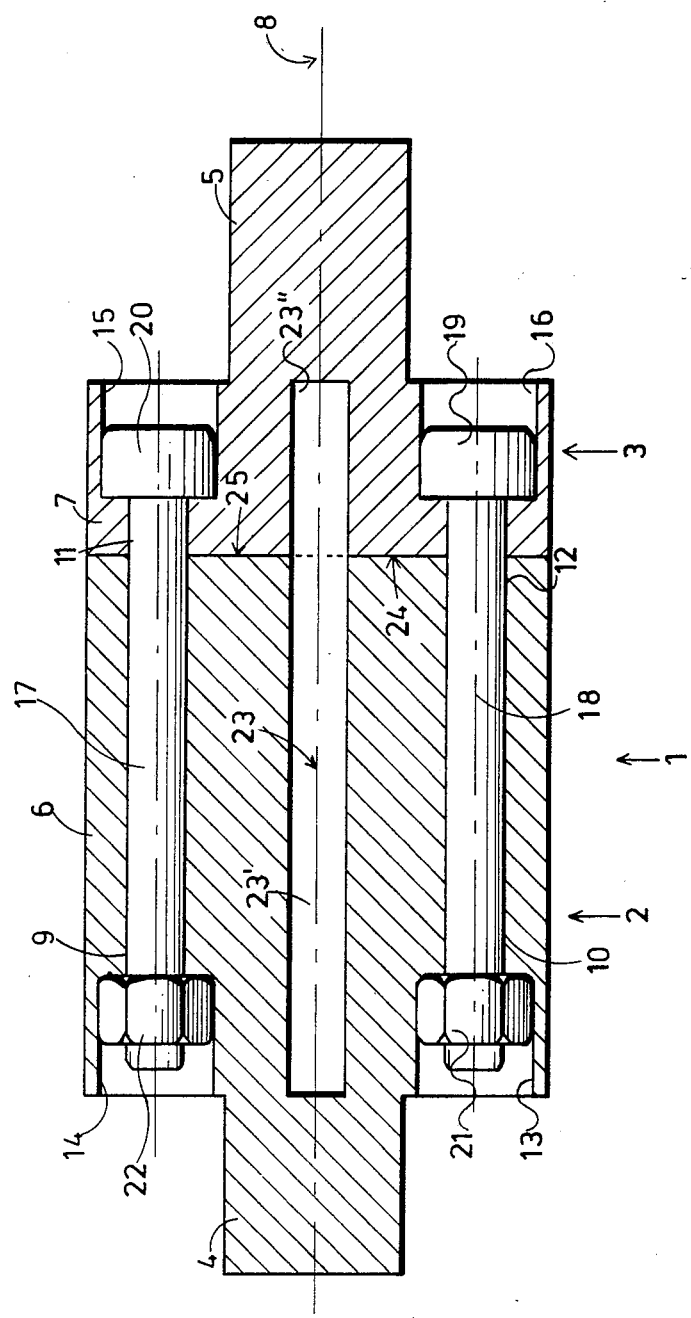

METHOD OF PRODUCING A ROTOR FOR ROTARY SLIDE-VANE VACUUM PUMPS, AND A ROTOR PRODUCED BY SAID METHOD

BACKGROUND OF THE INVENTION

The invention relates to a method of producing a rotor for rotary slide-vane vacuum pumps. The invention further relates to a rotor produced by said method.

Production of the rotor poses a special problem in the manufacture of rotary slide-vane vacuum pumps. For example, the overall dimensions of the rotor should have tight tolerances, for reasons of quiet operation and minimum wear of the pump. This condition can be substantially satisfied through one-piece construction of the rotor, for example. The rotor can then be machined completely without the workholding fixture being changed, with the result that the outside measurements of the rotor have very small tolerances relative to one another. However, with a one-piece rotor the production of the slots for the slide vane or vanes is possible only by immersed machining, which makes it complicated and expensive, especially when the slots extend through the entire rotor and therefore must be machined very accurately for reasons of tightness.

From U.S. Pat. No. 2,782,725 it is known to produce the rotor of a rotary slide-vane machine in two sections. To permit the two rotor sections to be joined properly centered after their production, their front edges are provided with mating projections and recesses. A drawback of this arrangement is that the rotor section, and particularly the projections and recesses, must be produced to extremely close tolerances. The accuracy requirements become all the more stringent as the required rotative speed of the pump increases.

SUMMARY OF THE INVENTION

The object of the present invention is to provide a method for the production of a rotor for rotary slide-vane pumps whereby the requisite high precision is achieved in a relatively simple manner.

In accordance with the invention, this object is accomplished by a production method comprising the following successive steps:

(a) two rotor sections, each comprising a shaft stub, a rotor portion and a plane surface which later becomes the contact surface as the two sections are assembled, are produced by lathing;

(b) the slots intended to accommodate one or more slide vanes are produced in the future contact surfaces by grinding, milling, eroding or the like;

(c) the two sections are assembled by means of an assembling jig and joined together; and (d) the external surfaces of the now one-piece rotor are finished with respect to length and/or diameter while the rotor is held in one and the same fixture.

With a production method of this type, production of the slots for the slide vanes is a simple matter since the surfaces which in the finished rotor are in contact with each other are still readily accessible. The finishing can be done after the two sections have been assembled, and therefore can be done without changing workholding fixtures so that the desired outside measurements can be obtained with small tolerances relative to one another in a simple manner. A further advantage is that the two rotor sections which later are assembled to form a rotor may be of identical shapes, which is a factor in volume production.

Still another advantage is that the production method in accordance with the invention readily lends itself also to the production of rotors of different lengths, and hence to the manufacture of different types of pumps by the modular-unit system. For example, production of just two rotor sections with different rotor-portion lengths permits the assembly of three rotors of different lengths, namely, a short rotor consisting of two short rotor sections, a long rotor formed by two long rotor sections, and a rotor of intermediate length consisting of a long rotor section and a short rotor section.

BRIEF DESCRIPTION OF THE DRAWING

Further details and advantages of the present invention will now be described with reference to a rotor produced by the method of the invention and shown in section in the FIGURE of the accompanying drawing.

DETAILED DESCRIPTION OF THE INVENTION

The rotor 1 consists of two rotor sections 2 and 3, each of which comprises a shaft stub 4 or 5 and a rotor portion 6 or 7, respectively. The axis of the rotor 1 is designated 8. Parallel bores 9 and 10 or 11 and 12, respectively, which at their shaft-stub ends have enlargements 13 and 14 or 15 and 16, respectively, are provided in the rotor sections 2 and 3. The bores 9 to 12 serve to hold bolts 17 and 18 whereby the two rotor sections 2 and 3 are rigidly joined together. The heads 19 and 20 and the nuts 21 and 22 of these bolts are accommodated in the enlargements 13 to 16 and therefore do not project from the shaft-stub ends of the rotor sections 2 and 3. The nuts 21 and 22 may be dispensed with if suitable screw threads are provided in the bores 9 and 10.

The rotor 1 comprises a continuous slot 23, which is formed by the slot portions 23' and 23" in the rotor sections 2 and 3. Apart from this, the rotor sections 2 and 3 are solid. They abut on each other at two plane surfaces 24 and 25.

A rotor of the type shown and described is produced by first rough-lathing the rotor sections 2 and 3 with relatively wide tolerances. The rotor portions may be of the same length or of different lengths. The surfaces 24 and 25 by which the two rotor sections are later joined may be finished at the outset.

The sections 2 and 3 are then provided with the bores 9 to 11 and the enlargements 13 to 16 thereof at their shaftstub ends if the two sections are later to be joined in the manner shown by means of bolts 17 and 18. However, the two sections 2 and 3 may also be riveted together. Or they might be welded or soldered together, which, however, would entail the well-known distortion problems.

After the slot portions 23' and 23" have been produced in the rotor sections 2 and 3, which in the assembled condition form the slot 23, the rotor is assembled by the use of an assembling jig. The slot portions thus may have been produced in simple manner by grinding, milling, eroding or the like since the rotor sections 2 and 3 were then still accessible from their surfaces 24 and 25. The bolts 17 and 18 may be prestressed by means of the nuts 21 and 22 to such a degree that additional pinning may be dispensed with. The assembling jig may consist of a simple assembling slider and/or of an outer prism.

After the rotor sections 2 and 3 have been assembled and joined together, the external surfaces can be finished. This may be done by further lathing in one and the same fixture or, if the rotor sections 2 and 3 have already been produced to griding accuracy, simply by grinding.

It will be appreciated that the instant specification and claims are set forth by way of illustration and not limitation, and that various changes and modifications may be made without departing from the spirit and scope of the present invention.

What is claimed is:

1. A method of producing a rotor for a rotary slide-vane vacuum pump, comprising, in order, the steps of:
   (a) providing two unitary rotor sections, each having a shaft stub with an axis about which the rotor will be rotated, a rotor portion and a contact surface which lies entirely within a single plane which intersects the axis of the shaft stub and which is parallel to the plane of the contact surface of the other rotor section when the rotor sections are fixedly joined together;
   (b) forming across the contact surface of each rotor section a slot which intersects the axis of the shaft stub of the section for accommodating one or more slide vanes, whereby the slots may be formed in the then exposed contact surfaces by mere milling or the like;
   (c) fixedly joining the rotor sections together with their contact surfaces butting and the slots therein aligned; and
   (d) finishing the external surface of the fixedly joined rotor sections at least with respect to diameter, whereby, because the rotor sections are fixedly joined together when externally finished, the finishing can achieve precise tolerances approximating those obtainable if the rotor had been unitary.

2. The method according to claim 1, wherein fixedly joining the rotor sections comprises forming at least two alignable bores in the rotor sections and inserting bolts into the bores.

3. The method according to claim 1 or claim 2, wherein providing the rotor sections comprises providing them to grinding accuracy.

4. A rotor for a rotary slide-vane vacuum pump, the rotor comprising two rotor sections and means for fixedly joining the rotor sections together, each of the rotor sections being unitary and comprising a shaft stub with an axis about which the rotor will be rotated, a rotor portion, a contact surface which lies entirely within a single plane which intersects the axis of the shaft stub and which is parallel to the plane of the contact surface of the other rotor section when the rotor sections are fixedly joined together, and a slot across the contact surface which intersects the axis of the shaft stub thereof and aligns with the slot across the contact surface of the other rotor section when the rotor sections are fixedly joined together, whereby the slots may be easily formed before the rotor sections are fixedly joined together and the rotor finished after the rotor sections are fixedly joined together with precise tolerances approximating those obtainable if the rotor had been unitary.

5. The rotor according to claim 4, wherein the rotor sections are provided to grinding accuracy.

6. The rotor according to claim 4, wherein the two rotor sections have identical dimensions.

7. The rotor according to claim 4, wherein the two rotor sections have rotor portions of different lengths.

8. The rotor according to claim 4, wherein the means of fixedly joining the rotor sections together comprises two bores which extend into the contact surface of each rotor section and are aligned when said sections are fixedly joined and bolts extending between said aligned bores.

9. The rotor according to claim 8, wherein the bores extend into each rotor section from its shaft-stub end and are provided at their shaft-stub ends with enlargements for countersinking at least heads of the bolts.

10. The rotor according to claim 12, wherein screw threads for the bolts are provided in a portion of the bores.

11. A unitary rotor section for a rotor for a rotary slide-vane vacuum pump, comprising:
   (a) a rotor portion;
   (b) a shaft stub projecting from one end of the rotor portion with an axis about which the rotor section will be rotated when fixedly joined to another rotor section in use;
   (c) a contact surface on the other end of the rotor portion, the contact surface lying entirely within a single plane which intersects the axis of the shaft stub;
   (d) a slot across the contact surface which intersects the axis of the shaft stub, whereby the slot may be merely milled therein or the like; and
   (e) means for allowing the rotor section to be fixedly joined to another rotor section having a parallel contact surface when so fixedly joined, contact surface to contact surface, whereby the fixedly joined rotor sections form a rotor which may be finished to tolerances of a precision approaching those obtainable if the rotor had been unitary.

* * * * *

UNITED STATES PATENT AND TRADEMARK OFFICE
CERTIFICATE OF CORRECTION

PATENT NO. : 4,561,837

DATED : December 31, 1985

INVENTOR(S) : Hanns-Peter Berges et al.

It is certified that error appears in the above-identified patent and that said Letters Patent is hereby corrected as shown below:

Claim 10, line 1, "12" should be -- 8 --.

Signed and Sealed this

Twentieth Day of May 1986

[SEAL]

Attest:

DONALD J. QUIGG

Attesting Officer

Commissioner of Patents and Trademarks